US007107411B2

(12) United States Patent
Burton et al.

(10) Patent No.: US 7,107,411 B2
(45) Date of Patent: Sep. 12, 2006

(54) APPARATUS METHOD AND SYSTEM FOR FAULT TOLERANT VIRTUAL MEMORY MANAGEMENT

(75) Inventors: David Alan Burton, Vail, AZ (US); Noel Simen Otterness, Lafayette, CO (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 10/737,117

(22) Filed: Dec. 16, 2003

(65) Prior Publication Data
US 2005/0132249 A1 Jun. 16, 2005

(51) Int. Cl.
*G06F 12/00* (2006.01)

(52) U.S. Cl. .......................................... 711/147; 714/5
(58) Field of Classification Search ................ 711/147, 711/170, 203; 714/5
See application file for complete search history.

(56) References Cited

U.S. PATENT DOCUMENTS

| | | | |
|---|---|---|---|
| 4,187,554 A | 2/1980 | Kammann | 365/15 |
| 4,942,579 A | 7/1990 | Goodlander et al. | 371/51 |
| 5,299,202 A | 3/1994 | Vaillancourt | 371/11.1 |
| 5,325,517 A | 6/1994 | Baker et al. | 395/575 |
| 5,388,242 A * | 2/1995 | Jewett | 711/113 |
| 5,537,631 A | 7/1996 | Wong et al. | 395/182.05 |
| 5,553,263 A | 9/1996 | Kalish et al. | 395/454 |
| 5,708,771 A | 1/1998 | Brant et al. | 395/182.2 |
| 5,784,548 A | 7/1998 | Liong et al. | 395/182.04 |
| 5,862,316 A * | 1/1999 | Hagersten et al. | 714/15 |
| 5,887,270 A | 3/1999 | Brant et al. | 711/162 |
| 5,896,492 A | 4/1999 | Chong, Jr. | 395/182.01 |
| 5,909,540 A * | 6/1999 | Carter et al. | 714/4 |
| 5,953,742 A | 9/1999 | Williams | 711/154 |
| 5,991,852 A | 11/1999 | Bagley | 711/112 |
| 6,065,102 A | 5/2000 | Peters et al. | 711/151 |
| 6,105,116 A | 8/2000 | Mori | 711/162 |
| 6,295,594 B1 | 9/2001 | Meier | 711/171 |
| 6,574,749 B1 * | 6/2003 | Parsons | 714/15 |
| 6,738,870 B1 * | 5/2004 | Van Huben et al. | 711/150 |
| 2003/0041220 A1 * | 2/2003 | Peleska | 711/162 |

FOREIGN PATENT DOCUMENTS

| | | |
|---|---|---|
| EP | 0 372 578 | 6/1990 |
| EP | 0 817 053 | 1/1998 |
| JP | 2 202 637 | 6/1990 |
| JP | 7 013 789 | 6/1990 |
| JP | 10 177 498 | 6/1998 |

OTHER PUBLICATIONS

Nicholas S. Bowen, et al, "A Fault Tolerant Hybrid Memory Structure and Memory Management Algorithms", IEEE Transaction on Computers, vol. 44 No. 3, Mar. 1995.

* cited by examiner

*Primary Examiner*—Woo H. Choi
(74) *Attorney, Agent, or Firm*—Kunzler & Associates

(57) ABSTRACT

A fault tolerant synchronized virtual memory manager for use in a load sharing environment manages memory allocation, memory mapping, and memory sharing in a first processor, while maintaining synchronization of the memory space of the first processor with the memory space of at least one partner processor. In one embodiment, synchronization is maintained via paging synchronization messages such as a space request message, an allocate memory message, a release memory message, a lock request message, a read header message, a write page message, a sense request message, an allocate read message, an allocate write message, and/or a release pointer message. Paging synchronization facilitates recovery operations without the cost and overhead of prior art fault tolerant systems.

29 Claims, 11 Drawing Sheets

Policy
Assignment
Module
1105

Memory
Manager
220

Fig. 11

APPARATUS METHOD AND SYSTEM FOR FAULT TOLERANT VIRTUAL MEMORY MANAGEMENT

BACKGROUND OF THE INVENTION

1. Field of the Invention

The invention relates to devices, methods, and systems for improving fault tolerance in computing systems. Specifically, the invention relates to devices, methods, and systems for managing virtual memory in fault tolerant multi-processor systems.

2. Description of the Related Art

Modem computer systems employ an operating system to manage system resources and to provide a foundation for application programs running on a computer system. The operating system provides a base for writing and running application programs, thereby freeing programmers from the details of computer system hardware. In addition, the operating system manages processes, memory, file systems, I/O systems, and the like.

In most operating systems, a process generally refers to a running program having inputs, outputs, state information, and a code image containing program codes. The state information may include the current values of the program counter, the registers, and the variables of an executing program. In many systems, each process consists of one or more threads that may be executed concurrently with each other. Processes and threads are well known in the art.

Running a process generally requires executing a thread that accesses the program codes and state information associated with the process. The program codes and state information are typically referenced by relative locations within a virtual address space associated with the process. Accessing the virtual address space typically involves utilizing memory management operations provided by the operating system and supporting hardware.

In particular, the operating system often includes a virtual memory system that maps virtual addresses associated with a thread from a large virtual address space to an actual physical address within a physical memory such as an array of RAM chips. In order to support virtual addressing, memory systems are often configured with multiple types or classes of memory. Some memory classes may be optimized for performance while other classes may be optimized for high capacity, low cost, removability, non-volatility or the like.

Virtual memory systems have been developed to facilitate sharing of the system memory by storing instructions and data in the several memory classes while giving the appearance that all elements are stored in the system memory. A virtual memory manager typically manages memory allocation, memory sharing, memory mapping and the like. A virtual memory address space is usually organized into memory address segments called pages, the page size often being determined by hardware considerations.

FIG. 1 is a block diagram illustrating a typical virtual memory system 100. The depicted virtual memory system 100 includes at least one process 110, a plurality of memory pages 114, a memory manager 120, a file system 130, a page table 140, a page map 150, at least one CPU 160, a storage controller 170, one or more storage devices 172 such as disk drives, a storage cache 180, a system memory 190, a CPU memory bus 122, a system data bus 124, and a system memory bus 126. The depicted virtual memory system 100 exemplifies many aspects of currently available virtual memory systems.

The process 110 has a thread (not shown) associated with a virtual address space (not shown), the virtual address space being organized into pages 114. The memory manager 120 allocates at least one page 114 in system memory 190 to the process 110. The memory manager constructs entries in a multiplicity of data structures such as the page table 140 that may contain entries such as a page usage log, a page lock status, a set of page sharing attributes, a page owner list and the like. The memory manager 120 may also construct entries in the page map 150 such as a virtual page address and a corresponding physical address of a page in the system memory 190.

The CPU 160 requests the contents of a virtual memory address by asserting the virtual memory address on the CPU memory bus 122. The memory manager 120 translates the virtual memory address to a physical memory address by mapping the entries in the page map 150. If the page containing the requested memory address is in physical memory, the memory manager 120 asserts the physical memory address on the system memory bus 126 and the corresponding data is asserted by the system memory 190 for use by the CPU 160. If the page containing the requested memory address is not in physical memory, the memory manager 120 typically generates a page fault. Page mapping and page faults are well known in the art.

In the event of a page fault, the memory manager 120 may subsequently request that the file system 130 access a page in the storage device 172 or the storage cache memory 180 that contains the requested memory address and copy the page to the system memory 190. The file system 130 typically issues a command to the storage controller 170 to retrieve the page containing the requested memory address. The storage controller 170 may determine if the page containing the requested memory address is in the storage cache memory 160, and if the page containing the requested memory is present, the storage controller 170 may copy the page to the system memory 190 by means of the system data bus 124.

In the event the page containing the requested memory address is not present in the storage cache memory 180, the storage controller 170 typically issues at least one read command to the storage device 172. The storage device 172 subsequently retrieves a set of memory blocks containing the page, and the storage controller 170 copies the page to the system memory 190. Subsequently, the memory manager 120 updates data structures associated with the newly copied page and asserts the physical memory address on the system memory bus 126. Significant performance degradation occurs whenever a page fault requires that a page be retrieved from the storage device 172.

In modern computer systems, operating systems generally allow multiple threads to execute virtually simultaneously in a virtual address space. For example, multiple threads on multiple CPUs could simultaneously perform page faults. Multiple threads may also execute a system call to map a file from a secondary storage device into the virtual address space. However, when multiple threads are attempting to access the same region in a virtual address space, a problem of contention arises. For example, if two threads are allowed to operate on the same virtual page in a region, the data may not be synchronized or updated properly. To address the contention problem, conventional techniques have used a "lock" to synchronize access by providing exclusive access to a thread such that other threads are not allowed to change the data accessed by the thread. In this manner, the lock ensures mutual exclusion of multiple threads for updates.

Data processing systems are often configured to improve fault tolerance by employing redundant elements. Several architectures are available that provide continuity of service with single point failures Some systems provide fault tolerant storage systems by using two or more storage processor nodes to control an array of redundant disk memories. If one storage processor node fails, another of the storage processor nodes can provide uninterrupted access to data stored on the array of redundant disk memories. Some systems use the multiple redundant storage processor nodes in a multiple parallel execution mode, each of the redundant storage processor nodes mirroring the operations of the other redundant storage processor nodes. Other systems typically use the two or more redundant storage processor nodes in a multiple active mode, wherein the two or more storage processor nodes execute concurrent unrelated threads. The multiple active mode results in better system performance in the case where the operation of the system requires significant disk memory activity.

Systems that use the two or more redundant processor nodes in multiple active (i.e. load sharing) mode may utilize virtual memory management techniques. Transparent fault recovery methods in systems that use processor nodes in multiple active mode generally require that data maps and state information for every active process be recovered. Maintenance of data and state information for all process threads typically requires that the system memory of each active processor node maintain synchronization with all other partner storage processor node memories.

What is needed are devices, methods and systems to maintain synchronization between the system memories of two or more processor nodes executing multiple disjoint threads in a virtual memory environment. The memory managers associated with the processor nodes need to manage memory allocation, memory sharing and memory mapping functions while simultaneously maintaining synchronization between system memories of all partner processing nodes. Such devices, methods and systems would provide the advantage of transparent system recovery in the event of a processor node failure in a system using multiple active processor nodes in a virtual memory environment.

BRIEF SUMMARY OF THE INVENTION

The various elements of the present invention have been developed in response to the present state of the art, and in particular, in response to the problems and needs in the art that have not yet been fully solved by currently available virtual memory managers. Accordingly, the present invention provides an improved apparatus, method, and system for synchronized fault tolerant virtual memory management.

In one aspect of the present invention, an apparatus for fault tolerant memory management includes one or more storage devices and a processing node configured to access the storage devices and respond to paging synchronization messages. The processing node includes a memory manager configured to manage memory as directed by the paging synchronization messages, and a communication module operably connected to the memory manager. In some embodiments, the storage devices are redundantly arranged (i.e., RAID) storage devices that enable data recovery under a multiplicity of fault types and degrees of fault severity.

The processing node may be configured to receive paging synchronization messages from a partner processing node. In certain embodiments, the processing node is also configured to send synchronization messages to a partner processing node. The ability of the present invention to receive and respond to synchronization messages transferred between partner processing nodes promotes fault tolerance and provides the capability to recover from faults in partner nodes in multiple active processing systems.

In certain embodiments, the memory manager is further configured to allocate memory blocks and associate a globally unique identifier therewith, allowing an operating system and the memory manager to monitor and track the allocation throughout the lifetime of the allocation. The capability to identify the allocation becomes important as a system employing multiple processors, multiple concurrent processes, and multiple threads manages the complexity of memory allocation, memory sharing, memory recovery, and paging operations.

In certain embodiments, the memory manager includes a policy assignment module 1105 that associates a policy with a memory block allocation size, allowing the block size to be optimized based on application specific characteristics such as a typical data structure size, a cache line size, a RAID stripe size and the like. Optimizing operational characteristics of a virtual memory address space provides better system performance.

The apparatus for fault tolerant virtual memory management may be embodied as a storage controller; the storage controller configured as a virtual memory system wherein multiple concurrent processes share the storage controller resources and synchronization with other partner storage controllers is maintained. The ability to maintain synchronization between partner storage controllers operating in a multiple active mode allows a high degree of fault tolerance, transparent fault recovery, and improved system performance.

In another aspect of the present invention, a method for synchronizing memory management on fault tolerant computers includes receiving paging synchronization messages from a partner processing node and managing paging on the storage devices and a system memory in response to the paging synchronization messages. In certain embodiments the method of the present invention also sends paging synchronization messages to a partner processing node.

In a certain embodiment, the paging synchronization messages include a space request message, an allocate memory message, a release memory message, a lock request message, a read header message, a write page message, a sense request message, an allocate read message, an allocate write message, and a release pointer message. The aforementioned synchronization messages with their associated responses provide synchronization between two or more processing nodes within a fault tolerant processing system.

Various elements of the present invention are combined into a fault tolerant system including a first processing node configured to access a first storage device and send paging synchronization messages and a second processing node configured to access a second storage device and respond to paging synchronization messages received from the first processing node. A system comprising multiple active processor nodes of the present invention achieves synchronized memory management between the partner processing nodes, promotes fault tolerance, and provides the capability to recover from faults quickly and effectively.

The various elements and aspects of the present invention provide increased fault tolerance and more transparent fault recovery. The present invention increases uptime and improves performance by implementing a higher level of fault tolerance among multiple active processing nodes. These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 11 is a block diagram illustrating one embodiment of a memory manager of the present invention.

DETAILED DESCRIPTION OF THE INVENTION

Figure 1:
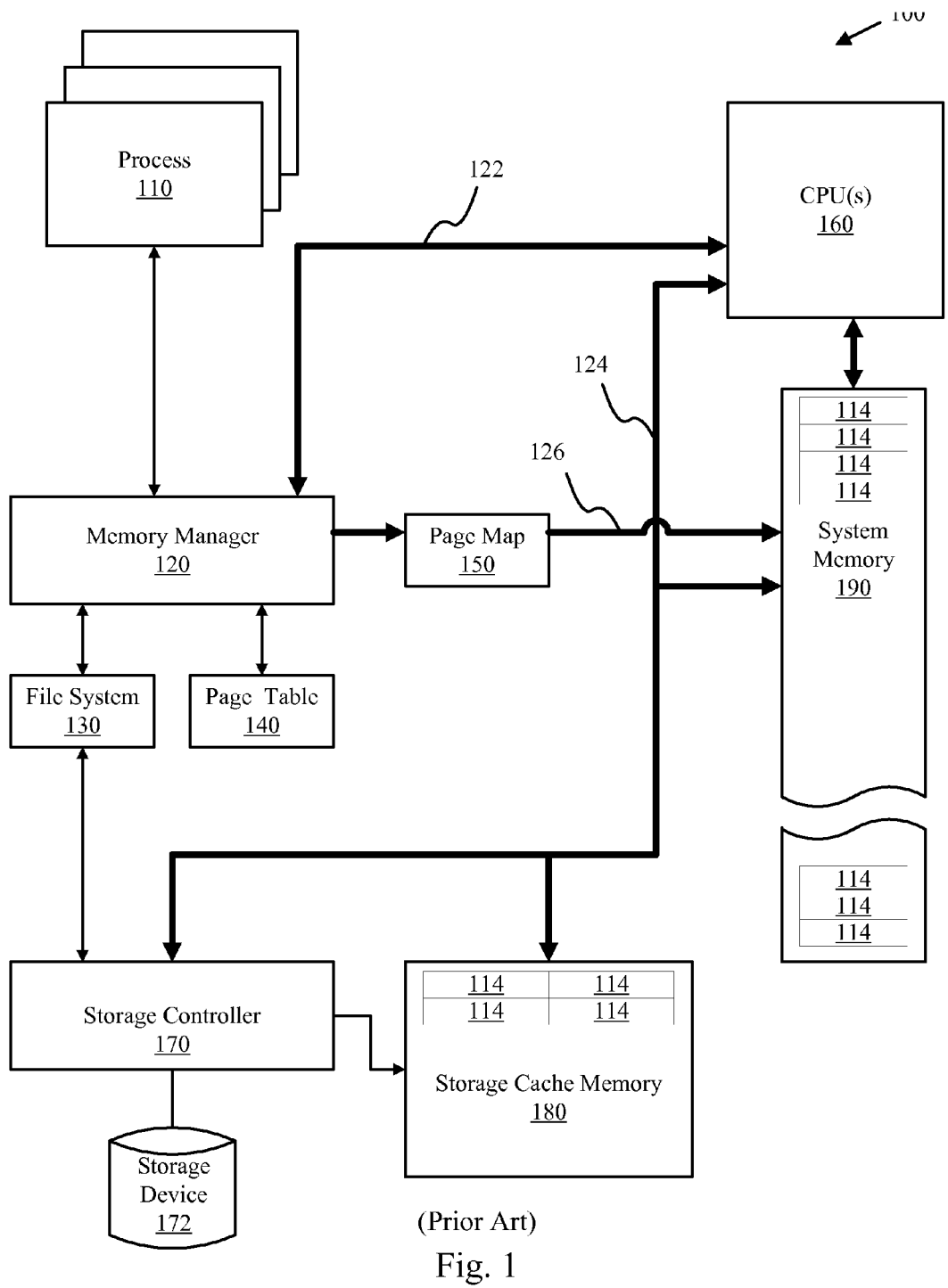
FIG. 1 is a block diagram illustrating a typical prior art virtual management system.

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 2 through 10, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

An objective for fault tolerance in multiple active storage processor nodes is that upon failure of a processor node, a partner node is capable of continuing the processes underway at the failed node without error. In order to accomplish the objective, the partner node requires access to the failed node's system state and contents of the failed node's system memory. Since the node system state data is typically small, the node state may be frequently written to shared non-volatile storage with minimal performance impact, and subsequently retrieved upon node failure. Access to the much larger failed node's system memory is more difficult, since frequent writing of the node system memory to non-volatile storage would impact performance dramatically. The difficulty is compounded in a node with virtual memory because data structures containing page maps, page tables and the like must be recovered.

The current invention maintains a duplicate copy of all pages resident in the memory of a processing node within the system memory of one or more partner processing nodes. Associated data structures such as page tables, page map and the like are also duplicated. In normal operation, each processor node executes unrelated processes while maintaining synchronized copies of the system memory of the partner nodes through the use of memory management methods such as those described in FIG. 4. Synchronization of the data structures and memory is conducted by sending messages, such as those described in FIG. 10 between the memory managers of partner nodes. Upon failure of a processor node, a partner node is able to continue execution by reading the failed node's state from shared non-volatile storage and using the synchronized copy of the failed node's system memory and virtual memory data structures.

Figure 2:
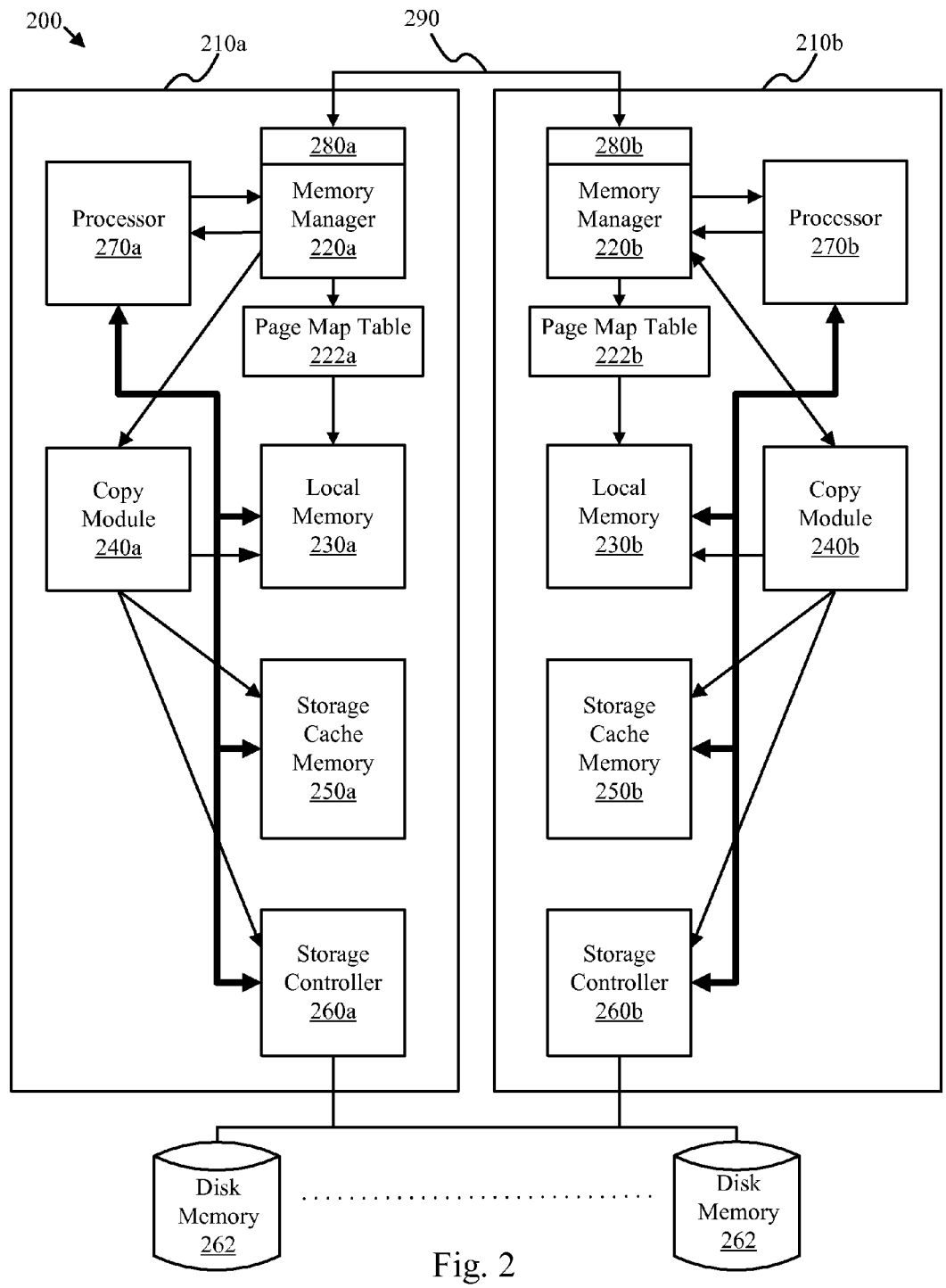
FIG. 2 is a block diagram illustrating one embodiment of a virtual memory system of the present invention.

FIG. 2 is a block diagram illustrating one embodiment of a fault tolerant virtual memory system 200 that addresses many of the problems and issues inherent in the prior art as discussed in the background section. The depicted fault tolerant virtual memory system 200 includes one or more shared disk drives 262 similar to the storage devices 172 of FIG. 1, a communication link 290, and processing nodes 211a and 210b. As depicted, the processing nodes 210a and 210b each include a processor 270, a copy module 240, a storage controller 260 similar to the storage controller 170 of FIG. 1, a storage cache memory 250 similar to the storage cache memory 180 of FIG. 1, a local memory 230, a memory manager 220, a page map table 222, and a communication module 280.

As depicted, the processing nodes 210a and 210b are partner nodes that are structured to be fault tolerant such that the functionality of the processing node 210a is substantially duplicated in the processing node 210b, and the functionality of the processing node 210b is substantially duplicated in the processing node 210a. To achieve transparent fault recovery, the processing nodes 210a and 210b must have knowledge of the other node's local memory, virtual memory data structures and process states. To facilitate fault tolerance, the state information on each node 210 is structured such that the last known state can be recovered from the shared disk memory 262.

The processing nodes 210 are configured to execute concurrent process threads that may be unrelated. As such, a copy of the partner node's paging states, page maps, page attributes, and the like is necessary for full recovery. Fault tolerance within the depicted system is achieved by mirroring data between the processing nodes 210a and 210b, retaining data on the disk memory 262 in a persistent manner, and by the memory managers 220a and 220b ensuring that paging occurs in a lock step manner such that the local memories and virtual memory data structures of processing nodes 210a and 210b are in sync with each other.

The memory managers 220 are responsible for allocating and releasing memory, handling system events such as failover or fail back events, managing synchronized paging operations, and informing the partner node that a specific allocation has been created or released. In one embodiment, the memory managers 220a and 220b are created and initialized at boot time on the nodes 210a and 210b, and communications are established between the memory managers 220a and 220b via communication modules 280a and 280b, and the communication link 290. The communication messages may be constructed such that there is no requirement placed upon the memory managers 220a and 220b to locate their pages or data structures in corresponding locations in local memory 230a and 230b.

The data structures maintained by the memory managers 220 may include the page map table 222 wherein a multiplicity of virtual memory addresses and their corresponding physical memory addresses are stored, and a page attribute table (not shown) wherein attributes such as lock attributes, usage history, page owners, globally unique identifiers and the like are stored The processor 270 provides the memory manager 220 with virtual addresses which the memory manager 220 translates into physical memory addresses using the page map 222. If, for example, the page containing the virtual address referenced by the processor 270a is not in physical memory, the memory manager 220a will cause space to be allocated in the local memories 230a and 230b and cause the required page to be copied into local memories 230a and 230b. The copy module 240 may perform the copy operation.

In a certain embodiment the copy module 240 manages paging operations between the storage controller 260, the storage cache memory 250, and the node local memory 230. In one embodiment, the copy module 240 uses different copy hardware and algorithms based on the characteristics of the source of the data, the target of the data, and the amount of data to be copied.

The storage cache memory 250 may store data as it is moved to and from the disk memory 262. The memory manager 220 may use storage retrieval strategies that load the storage cache memory 250 with several pages before and after a requested page, anticipating that a future request can be satisfied from the faster storage cache memory 250. The memory manager 220 may also use the storage cache memory 250 as part of a destage routine, wherein a dirty page is quickly copied to the storage cache memory 250 to free up local memory space and then later copied from the storage cache memory 250 to the disk memory 262 by a background task.

Figure 3:
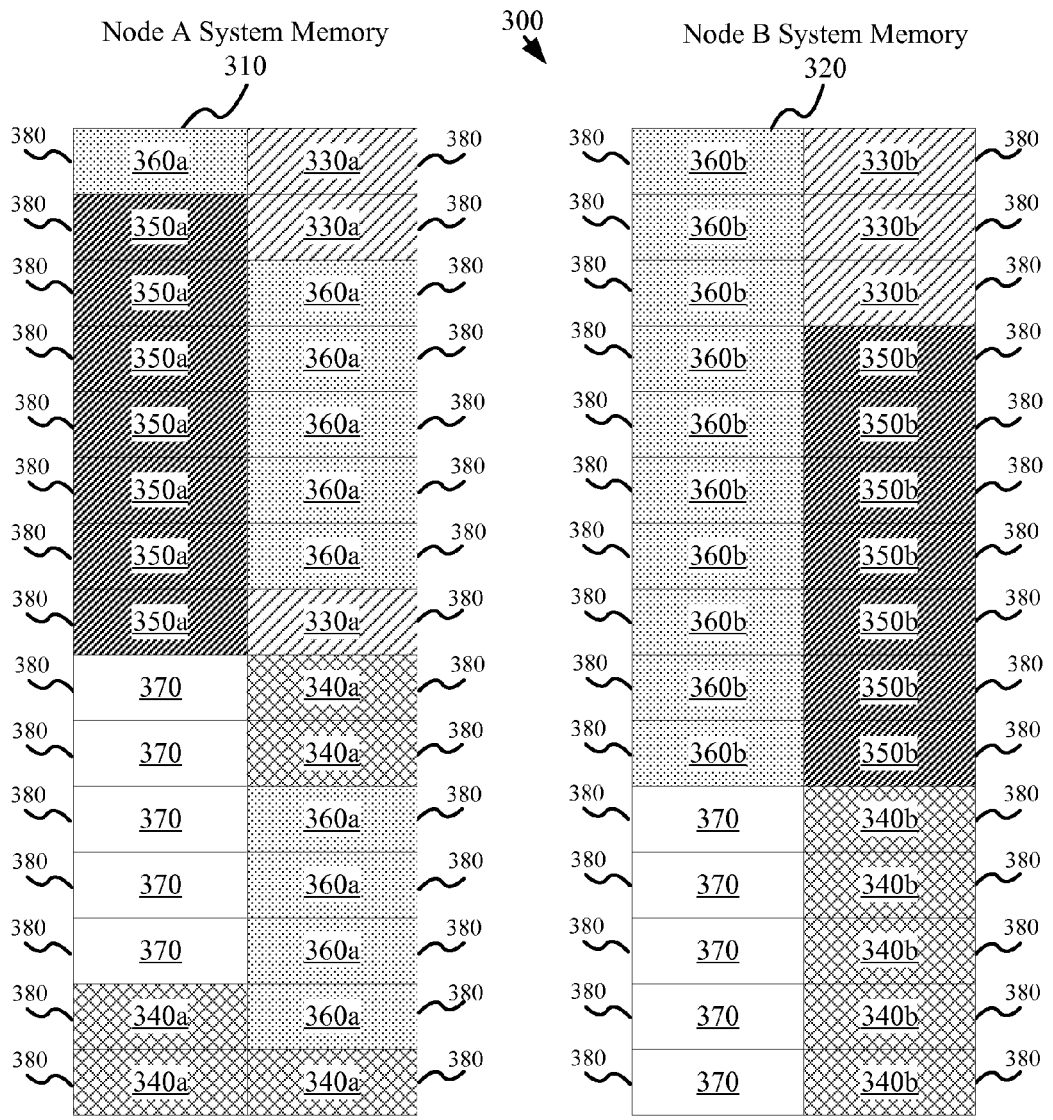
FIG. 3 is a block diagram illustrating an exemplary physical page map of the present invention.
Figure 3:
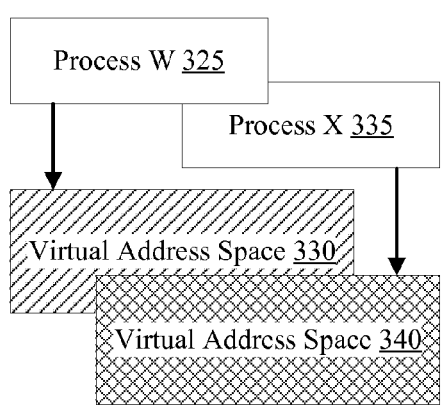
Figure 3:
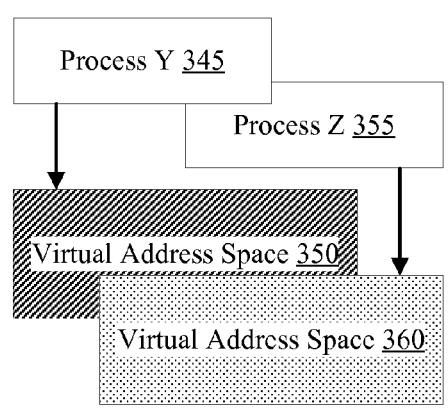

FIG. 3 is a block diagram illustrating an exemplary physical page map of the present invention. The depicted physical page map 300 includes a Node A local memory 310 similar to the local memory 230a of FIG. 2, a Node B local memory 320 similar to the local memory 230b of FIG. 2, a process W 325, a process X 335, a process Y 355, a process Z 365, and a plurality of virtual address spaces 330, 340, 350, and 360. The virtual address space 330 is associated with process W 325 and the virtual address space 340 is associated with process X 335, both processes executing on Node A. The virtual address space 350 is associated with process Y 345 and the virtual address space 360 is associated with process Z 355, both processes executing on Node B.

Each of the virtual address spaces 330, 340, 350, and 360 has a plurality of virtual pages. Node A Local memory 310 and Node B Local memory 320 have a plurality of physical pages 380; each physical page 380 containing a page from one of the virtual address spaces 330, 340, 350, 360, or a page 370 from a free memory pool. The exemplary physical page map 300 illustrates a physical page map for two multiple partner nodes executing independent processes under the present invention.

Node A local memory 310 and Node B local memory 320 are substantially similar local memories, divided into substantially similar memory pages. A process W 325 associated with virtual address space 330 and a process X 335 associated with virtual address space 340 may be active on Node A. A Process Y 345 associated with virtual address space 350 and a process Z 355 associated with virtual address space 360 may be active on processing node B. Note that at a first point in time, the processing node A may act as the originator of memory management operations; while at a second point in time, the processing node B may act as the originator of memory management operations.

As shown in the exemplary physical page map 300, the virtual memory manager of Node A allocates a multiplicity of physical pages 380 in Node A local memory 310 to process W and copies the pages 330a from virtual address space 330 into Node A local memory 310. At substantially the same time, the Node B virtual memory allocates a multiplicity of physical pages 380 in Node B local memory 320 to process W and copies the pages 330b from virtual address space 330 to Node B local memory 320, thus synchronizing the contents of Node B local memory 320 to the contents of Node A local memory 310 pertaining to virtual memory address space 330.

As illustrated in the exemplary physical page map 300, a physical location of a specific page from a virtual address space in Node A physical memory 310 does not correspond with the same physical location of the same page from the virtual address space in Node B local memory 320. Since a specific virtual address block page location within the Node A local memory 310 is different from the corresponding specific virtual address block page location within the Node B local memory 320, the virtual address to physical address translation table data structures are different. However, the data contained in a specific virtual address block page within Node A local memory 310 is identical with the corresponding virtual address block page within Node B local memory 320, thus making the Node A local memory 310 and the Node B local memory 320 a set of mirrored memories.

Figure 4:
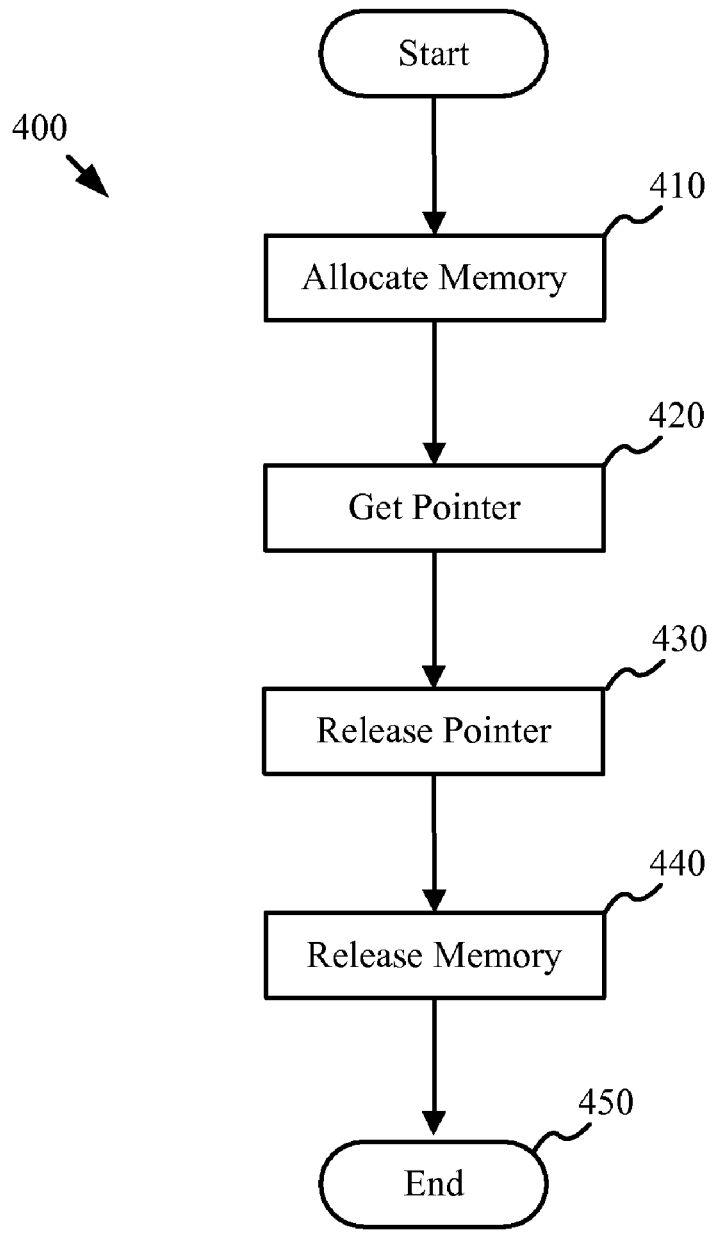
FIG. 4 is a flow chart illustrating one embodiment of a memory management method of the present invention.

FIG. 4 is a flow chart diagram illustrating one embodiment of a memory management method 400 of the present invention. The memory management method 400 may be conducted by a memory manager of an originating node similar to the memory manager 220 of FIG. 2 or may be conducted independent thereof. The depicted embodiment includes an allocate memory 410, a get pointer step 420, a release pointer step 430, a release memory step 440, and an end step 450. The memory management method 400 performs the essential memory management functions of memory allocation, memory sharing, paging, and memory recovery while at the same time maintaining memory synchronization with partner nodes.

In the depicted embodiment, the allocate memory step 410 receives a request to allocate a block of memory from a process or the operating system. Before an allocation can take place, the allocate memory step 410 polls all partner nodes to ascertain if adequate memory space is available on every node. If space is available, step 410 causes memory to be allocated in all partner nodes and causes data structures such as page maps, lock tables, usage history and the like to be created in all partner nodes. A more detailed description of the allocate memory step is set forth in the allocate memory method 500 of FIG. 5.

The get pointer step 420 performs memory sharing and paging operations and may be conducted by a memory manager of an originating node, such as the memory manager 220 of FIG. 2. In the depicted embodiment, step 420 responds to a request for a pointer or similar memory reference that identifies the specific physical address of a page in a local memory. The request differentiates between a read pointer and a write pointer, since memory may be shared for reading, but only one process may "own" a page for writing.

If the page is in memory and is available for reading or writing, the get pointer step 420 examines the lock status on all partner nodes, and causes an a read lock or a write lock to be recorded in the data structures of all nodes. If the page is not in memory and if space is available on all nodes, the get pointer step 420 pages the block into memory of all nodes and causes the data structures of all nodes to be updated. If the page is not in the local memory and insufficient space is available to page into memory, or if the page is locked, the method returns a null. A more detailed description is set forth in the get read pointer method 600 of FIG. 6 and the get write pointer method 700 of FIG. 7.

The release pointer step 430 performs memory sharing and depaging operations, and may be conducted by a memory manager of an originating node. The release pointer step 430 receives a pointer release request indicating that an ownership of the page is to be released. If the page has been written, the page modifications are written to all partner nodes and to the disk, and data structures are updated on all nodes. If the page is no longer owned by any process, the memory space occupied by the page may be made available for other use. A more detailed description is set forth in the release pointer method 800 of FIG. 8.

The release memory step 440 deallocates blocks of memory, freeing the memory space for use by other processes. The release memory step 440 causes data structures to be dismantled on all nodes. A more detailed description is set forth in the release memory method 900 of FIG. 9.

Figure 5:
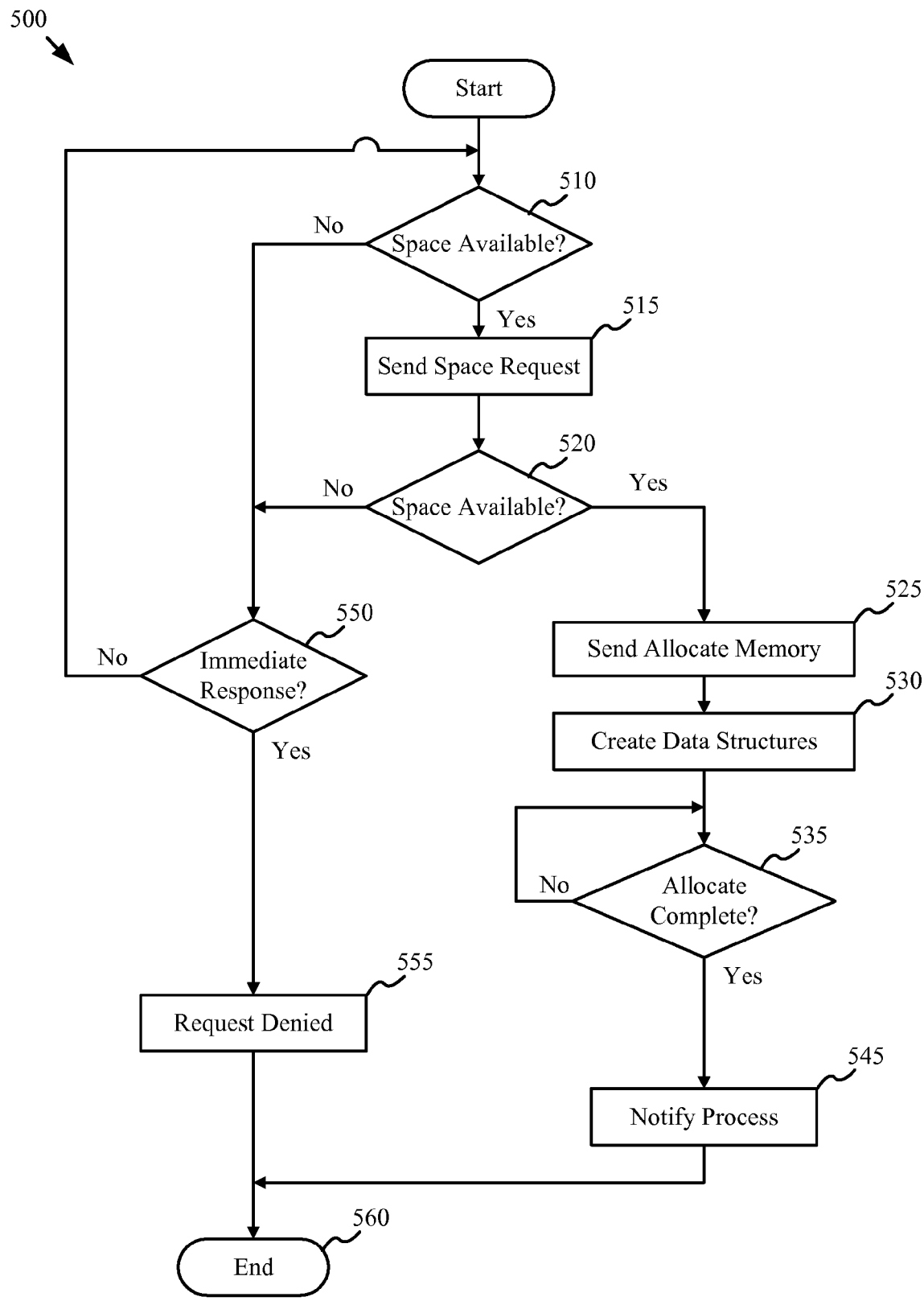
FIG. 5 is a flow chart illustrating one embodiment of a memory allocation method of the present invention.

FIG. 5 is a flow chart diagram illustrating one embodiment of a memory allocation method 500 of the present invention. The memory allocation method 500 may be conducted by a memory manager of an originating node similar to the memory manager 220 of FIG. 2 or may be conducted independent thereof. The depicted embodiment of the memory allocation method 500 includes a space available test 510, a send space request step 515, a space available test 520, a send allocate memory step 525, a create data structures test 530, an allocate complete test 535, a notify process step 545, an immediate response test 550, a request denied step, and an end step 560. The memory allocation method 500 may be called at the time a process is initiated.

The space available test 510 determines if sufficient local memory space is available to meet the allocation request. If adequate memory is not available, the immediate response test 550 determines if the memory allocation request asked for an immediate response. If an immediate response was requested, the request denied step 555 returns request denied status and control passes to the end step 560. If immediate response was not requested, the memory allocation method 500 continues to perform the memory space available test 510 until adequate local memory space is available. The send space request step 515 then sends a space request message to all other actives nodes and waits for response.

The space available test 520 examines the response received from each active node. If adequate memory space is not available on all partner nodes, the immediate response test 550 determines if the node memory request asked for an immediate response. If an immediate response was requested, the request denied step 555 returns request denied status and control passes to the end step 565.

If immediate response was not requested, the memory allocation method 500 continues to perform the space available test 520 until adequate memory is available on all partner nodes. The send allocate memory step 525 then sends a memory allocate message to all partner nodes. The create data structures step 530 initializes data structures to enable creation and management of an allocated virtual address space.

After the create data structures step 530, the allocation complete test 535 waits for a command complete response from all partner nodes indicating that memory has been successfully allocated. If the command complete message has not been received from each active node, the memory allocation method 500 continues to perform test 535 until all command complete messages are received. Subsequently, the notify process step 545 responds to the allocate memory request with a successful completion status and control passes to the end step 560.

Figure 6:
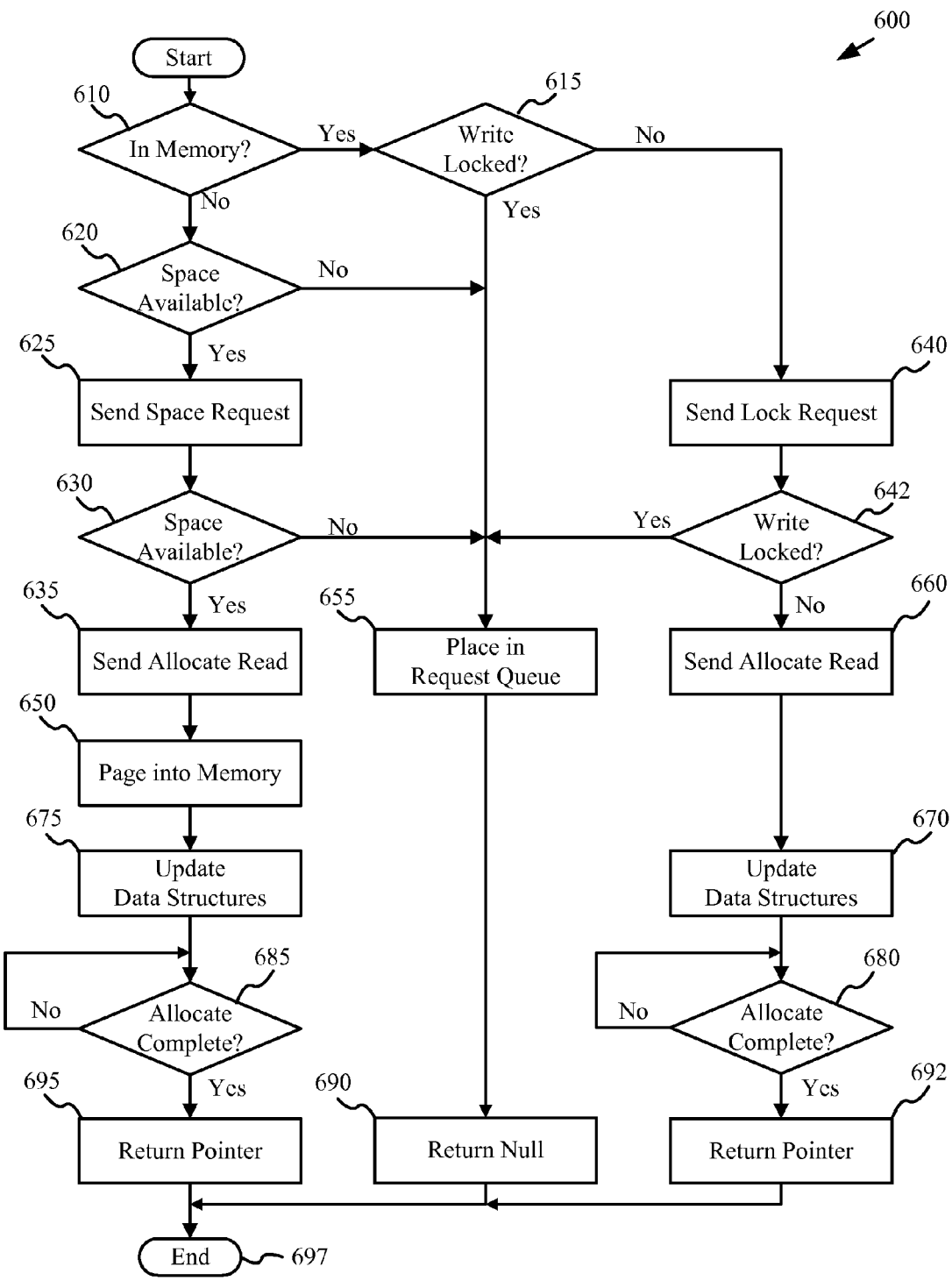
FIG. 6 is a flow chart illustrating one embodiment of an obtain read pointer method of the present invention.

FIG. 6 is a flow chart diagram illustrating one embodiment of an obtain read pointer method 600 of the present invention. The obtain read pointer method 600 may be conducted by a memory manager similar to the memory manager 220 of FIG. 2. The depicted embodiment of the obtain read pointer method 600 includes an in memory test 610, a write locked test 615, a space available test 620, a send space request step 625, a space available test 630, a send allocate read step 635, a send lock request step 640, a write lock test 642, a page into memory step 650, a place in request queue 655, a send allocate read step 660, an update data structures step 670, an update data structures step 675, an allocate complete test 680, an allocate complete step 685, a return null step 690, a return pointer step 692, a return pointer step 695, and an end step 697. The obtain read pointer method 600 may be called after allocation of memory for a process is successfully completed.

The depicted method 600 requests a pointer or similar memory reference that identifies the specific physical address of a page in a local memory, and may modify data structures to reflect read ownership of the page. If the page is not in the local memory and insufficient space is available to page into memory, or if the page is locked, the method returns a null. The data structures created at memory allocation time may contain provisions for a read lock and a write lock attribute for pages and the like.

Multiple concurrent process may be issued read pointers, and hence share memory resources. Only one process may be issued a write pointer, since owning a write pointer permits the process to modify the memory. A paging queue comprised of paging requests may be maintained by a queue management process, or the like separate from the obtain read pointer method 600. A virtual memory manager processes the paging queue by replacing pages in a local memory and thus creating space for the paging requests to be granted.

In one embodiment, the in memory test 610 examines data structures containing a multiplicity of virtual memory addresses and a corresponding multiplicity of physical memory addresses. If the requested page is in the local memory, the write locked test 615 examines the data structures to determine if the page is write locked. If the requested page is not write locked, the send lock request step 640 sends the lock request message to all partner nodes. Subsequently, the write locked test 642 examines the lock status returned by every active node. If the requested page is not locked by any of the partner nodes, the send allocate read step 660 sends an allocate read message to all partner nodes. The update data structures step 670 read locks the page and updates other data structures relating to the page.

The allocate complete test 680 then waits for a command complete response from all partner nodes indicating that data structures have been successfully synchronized. If the command complete message has not been received from each active node, the obtain read pointer method 600 continues to perform the release complete test 680 until all command complete messages are received. Subsequently, the return pointer step 692 returns a pointer that references a physical address of the page in local memory, and control is passed to the end step 697.

In the event that the write locked test 642 shows that the page is write locked by any active node, the place in request queue step 655 enters a paging request in the paging queue. Subsequently, the return null step 690 returns null status and then control is passed to the end step 697. In the event that the write locked test 615 shows that the requested page is write locked, the place in request queue step 655 enters a paging request in the paging queue. Subsequently, the return null step 690 presents null status and control is passed to the end step 697.

In the event that the in memory test 610 determines that the page is not in local memory, the space available test 620 examines a data structure indicating the amount of free space in local memory. If sufficient space is not available, the place in request queue step 655 enters a paging request in the paging queue. Subsequently, the return null step 690 returns null status and passes control to the end step 697. If sufficient local memory space is available, the send space request step 625 sends a space request message to all partner nodes. The space available test 630 examines the response received from each active node. If adequate memory space is not available on all partner nodes, the place in request queue step 655 enters a paging request in the paging queue. Subsequently, step 690 returns null status and then passes control to the end step 697.

In the event that the space available test 630 indicates that sufficient space is available on all partner nodes, the send allocate read step 635 sends an allocate read message to all partner nodes. The page into memory step 650 copies the page into local memory. The update data structures step 675 read locks the page and updates other data structures relating to the page.

The allocate complete test 685 waits for a command complete response from each active node indicating that the page has been loaded into each partner node memory and the partner node data structures have been successfully synchronized. If the command complete message has not been received from each active node, the obtain read pointer method 600 continues to perform the release complete test 685 until all command complete messages are received. Subsequently, the return pointer step 695 returns a pointer that references a physical address of the page in local memory, and then control passes to the end step 697.

Figure 7:
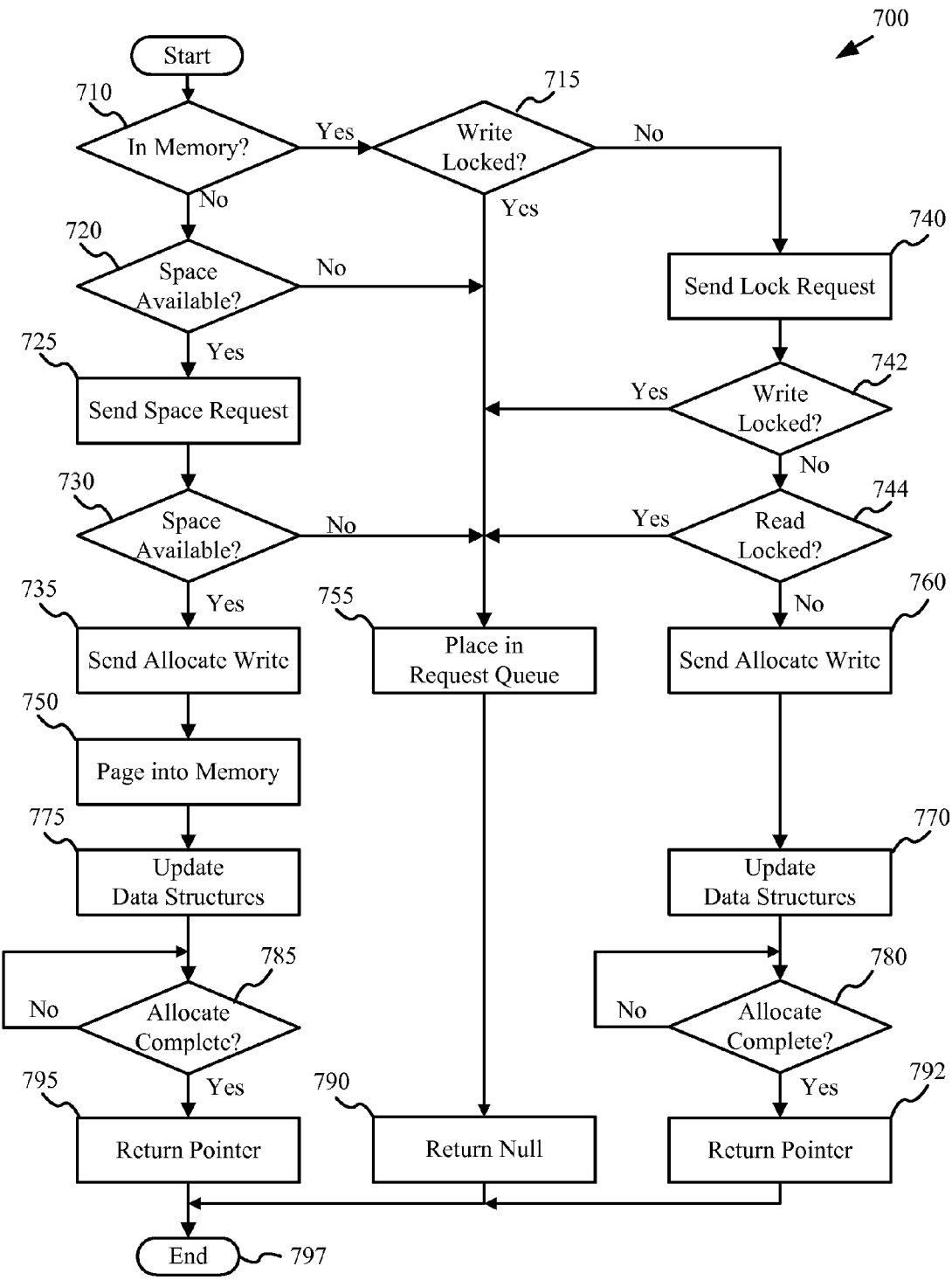
FIG. 7 is a flow chart illustrating one embodiment of an obtain write pointer method of the present invention.

FIG. 7 is a flow chart diagram illustrating one embodiment of an obtain write pointer method 700 of the present invention. The write pointer method 700 may be conducted by a memory manager similar to the memory manager 220 of FIG. 2 or the like. The depicted embodiment of the obtain write pointer method 700 includes an in memory test 710, a write locked test 715, a space available test 720, a send space request step 725, a space available test 730, a send allocate write step 735, a send lock request step 740, a write lock test 742, a read locked test 744, a page into memory step 750, a place in request queue 755, a send allocate write step 760, an update data structures step 770, an update data structures step 775, an allocate complete test 780, an allocate complete step 785, a return null step 790, a return pointer step 792, a return pointer step 795, and an end step 797. The obtain write pointer method 700 may be called after allocation of memory for a process is successfully completed.

The obtain write pointer method 700 requests a pointer or similar memory reference that identifies the specific physical address of a page in a local memory, and may modify data structures to reflect read ownership of the page. If the page is not in the local memory and insufficient free space is available to page into memory, or if the page is locked, the method returns a null. The data structures created at memory allocation time may contain provisions for a read lock and a write lock attribute for pages and the like.

Multiple concurrent process may be issued read pointers, and hence share memory resources. Only one process may be issued a write pointer, since owning a write pointer permits the process to modify the memory. A paging queue is maintained separate from the obtain write pointer method 700, the elements of the paging queue comprised of paging requests. A virtual memory manager may process the paging queue by replacing pages in a local memory, thus creating space for the paging requests to be granted.

The in memory test 710 examines data structures containing a multiplicity of virtual memory addresses and a corresponding multiplicity of physical memory addresses. If the requested page is in the local memory, the write locked test 715 examines the data structures to determine if the page is write locked. If the requested page is not write locked, the send lock request step 740 sends a lock request message to all partner nodes.

The write locked test 742 examines the lock status returned by every active node. If the requested page is not write locked by any of the partner nodes, the read locked test 744 examines the lock status returned by every active node. If the requested page is not read locked by any of the partner nodes, the send allocate write step 760 sends an allocate write message to all partner nodes. The obtain write pointer method 700 then proceeds to the update data structures step 770 by write locking the page and updating data structures relating to the page.

The allocate complete test 780 waits for a command complete response from all partner nodes indicating that data structures have been successfully synchronized. If the command complete message has not been received from each active node, the obtain write pointer method 700 continues to perform the release complete test 780 until all command complete messages are received. Subsequently, the return pointer step 792 returns a pointer that references a physical address of the page in local memory, and then control passes to the end step 797.

In the event that the read locked test 744 shows that the page is read locked by any active node, the place in request queue step 755 enters a paging request in the paging queue. Subsequently, the return null step 790 returns null status and then control is passed to the end step 797 In the event that the write locked test 742 shows that the page is write locked by any active node, the place in request queue step 755 enters a paging request in the paging queue. Subsequently, the return null step 790 returns null status and then control is passed to the end step 797. In the event the write locked test 715 shows that the requested page is write locked, the place in request queue step 755 enters a paging request in the paging queue. Subsequently, the return null step 790 returns null status and then passes control to the end step 797.

In the event that the in memory test 710 determines that the page is not in local memory, the space available test 720 examines a data structure indicating the amount of free space in local memory. If sufficient space is not available, the place in request queue step 755 enters a paging request in the paging queue. Subsequently, the return null step 790 returns null status and then passes control to the end step 797. If sufficient local memory space is available, the send space request step 725 sends a space request message to all partner nodes.

The space available test 730 examines the response received from each active node. If adequate memory space is not available on each active node, the place in request queue step 755 enters a paging request in the paging queue. Subsequently, the return null step 790 returns null status and then passes control to the end step 797.

In the event the space available test 730 indicates that sufficient space is available in all partner nodes, the send allocate write step 735 sends an allocate write message to all partner nodes. The page into memory step 750 copies the page into local memory, The update data structures step 775 write locks the page and further updates data structures relating to the page.

The allocate complete test 785 waits for a command complete response from all partner nodes indicating that the page has been loaded into memory and the data structures have been successfully synchronized. If the command complete message has not been received from each active node, the obtain write pointer method 700 continues to perform the release complete test 785 until all command complete messages are received. Subsequently, the return pointer step 795 returns a pointer that references a physical address of the page in local memory, and then control passes to the end step 797.

Figure 8:
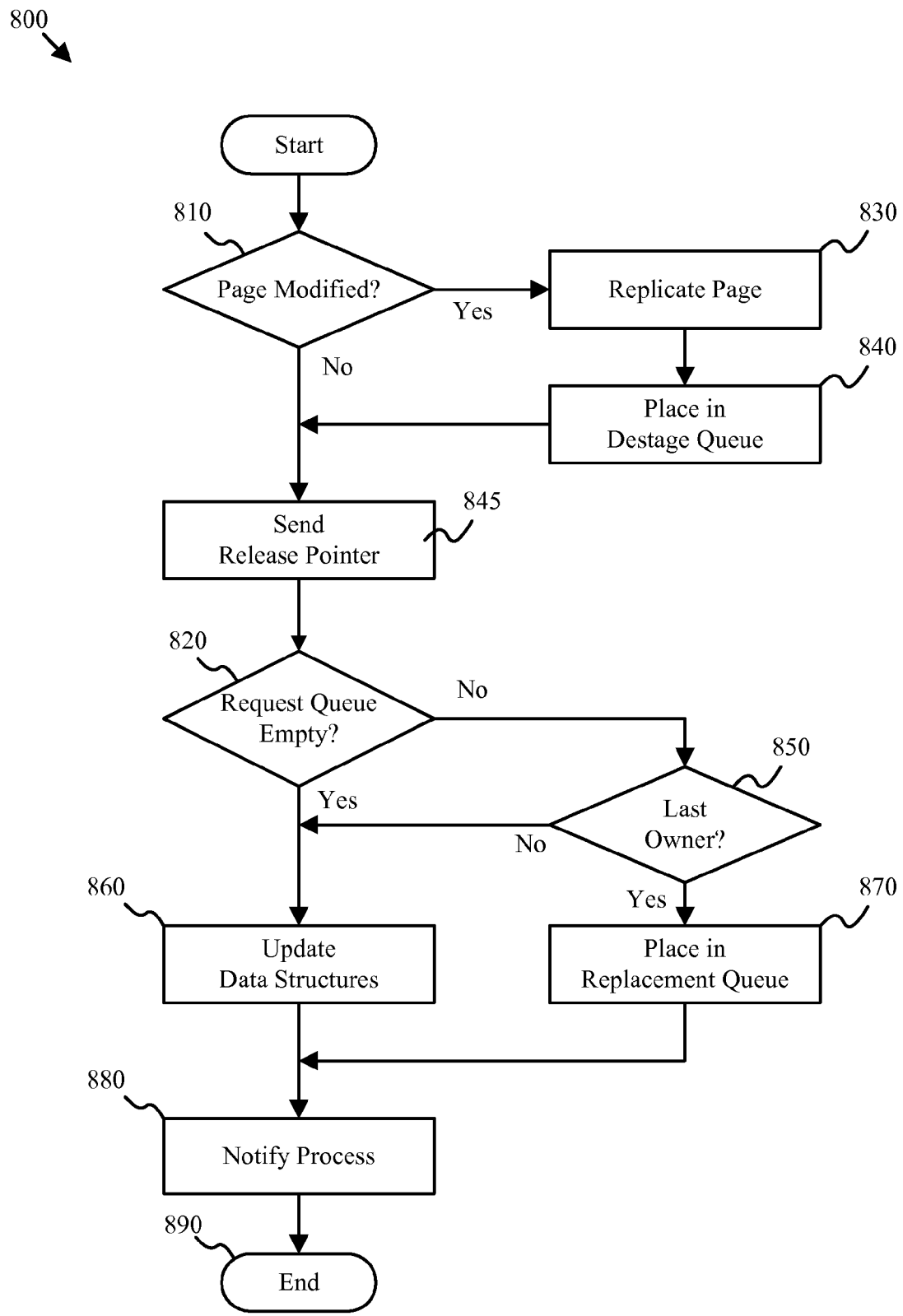
FIG. 8 is a flow chart illustrating one embodiment of a release pointer method of the present invention.

FIG. 8 is a flow chart diagram illustrating one embodiment of a release pointer method 800 of the present invention. The term pointer refers to any data structure that identifies a physical address in local memory. A memory manager similar to the memory manager 220 of FIG. 2 may perform the release pointer method 800, or it may be conducted independent thereof. The depicted embodiment of the release pointer method 800 includes a page modified test 810, a request queue empty test 820, a replicate page step 830, a place in destage queue step 840, a send release pointer step 845, a last owner test 850, an update data structures step 860, a place in replacement queue step 870, a notify process step 880, and an end step 890.

The release pointer method 800 may be initiated at the time an obtain write pointer method 800 replaces a page in local memory, at the time a process completes a transaction, or the like. The release pointer method 800 synchronizes an originating node local memory with all partner node local memories and updates data structures that were created at the time an obtain read pointer method 600 of FIG. 6 or an obtain write pointer method 700 of FIG. 7 was performed.

In the depicted embodiment, the page modified test 810 examines data structures contained in the local memory of an originating node. If the page modified test 810 determines that the page was modified, the replicate page step 830 copies the page to the local memories of all partner nodes, causing the page contents of the partner nodes to mirror the page contents of the originating node. The place in destage queue step 840 places a destaging request in the destaging queue and proceeds to the send release pointer step 845. In the event the page modified test 810 determines that the page was not modified, control passes to the send release pointer step 845.

The send release pointer step 845 sends a release pointer message to all partner nodes. The paging queue request test 820 examines the paging queue to determine if any paging requests are outstanding. If there are no paging requests, the update data structures step 860 updates data structures and passes control to the notify process step 880. If paging requests are outstanding, the last owner test 850 examines data structures to determine if the page is owned by another process. If the page is owned by another process, control passes to the update data structures step 860, which updates data structures and passes control to the notify process step 880. If the page is not owned by any other process, the place in replacement queue step 870 enters a replacement request in the replacement queue and passes control to the notify process step 880. The notify process step 880 sends command complete status and then passes control to the end step 890.

Figure 9:
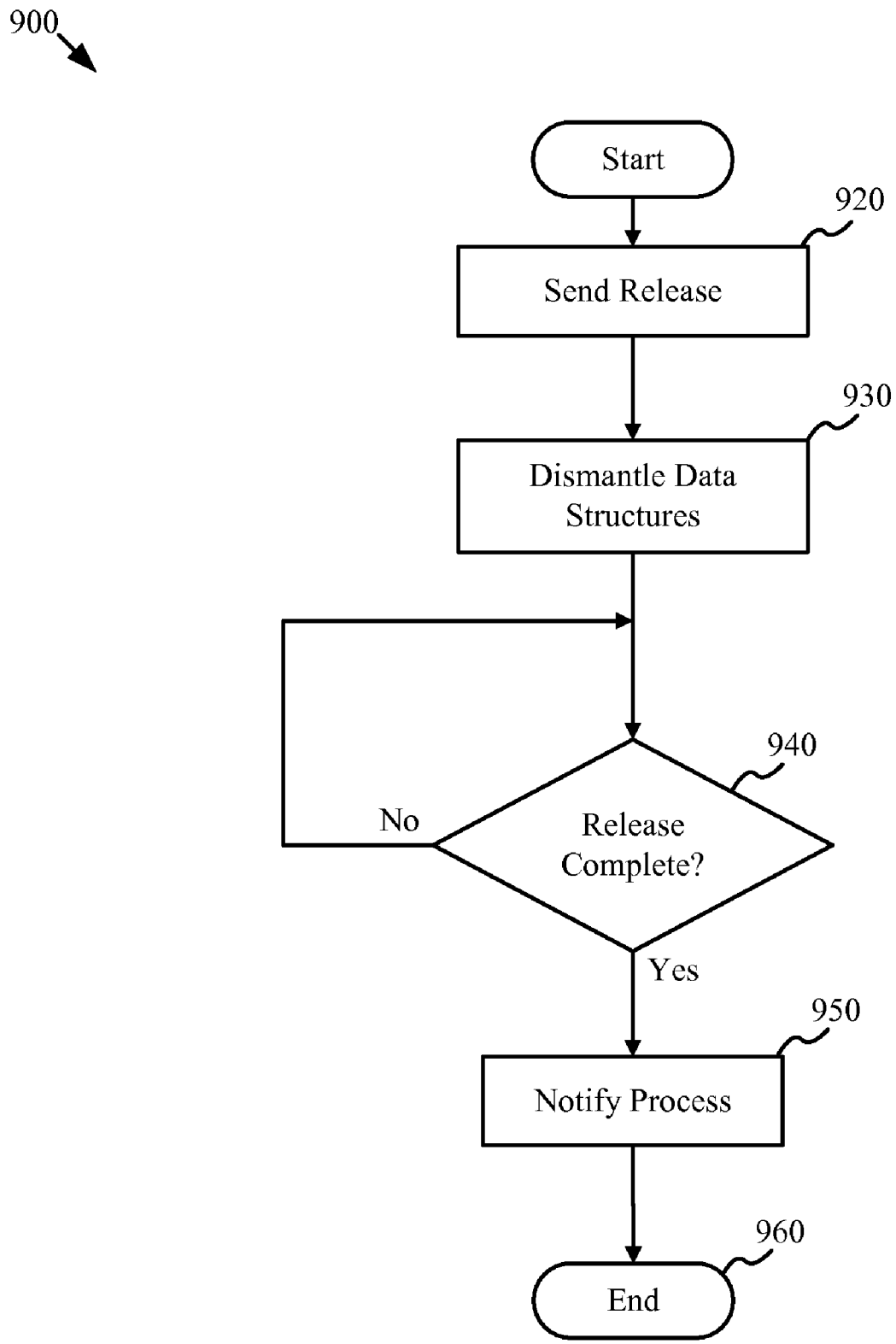
FIG. 9 is a flow chart illustrating one embodiment of a memory release method of the present invention.

FIG. 9 is a flow chart diagram illustrating one embodiment of a memory release method 900 of the present invention. An originating node memory manager such as the memory manager 220 of FIG. 2 or the like can conduct the memory release method 900. The depicted embodiment of the memory release method 900 includes a send release step 920, a dismantle data structures step 930, a release complete test 940, a notify process step 950, and an end step 960. The memory release method 900 may be called after a process has completed execution, and may be initiated by the operating system issuing a memory release for a specifically identified memory allocation.

The send release step 920 sends a release memory message to all partner nodes. The dismantle data structures step 930 destroys data structures that were previously constructed to manage the virtual memory space corresponding to the identified memory allocation. Subsequent to the dismantle data structures step 930, the memory release method 900 performs the release complete test 940 by waiting for a command complete response from all partner nodes indicating that memory has been successfully released. If the command complete message has not been received from each active node, the memory release method 900 continues to perform the release complete test 940 until all command complete messages are received. The notify process step 950 responds to the release memory request with a successful completion status and then control passes to the end step 960.

Figure 10:
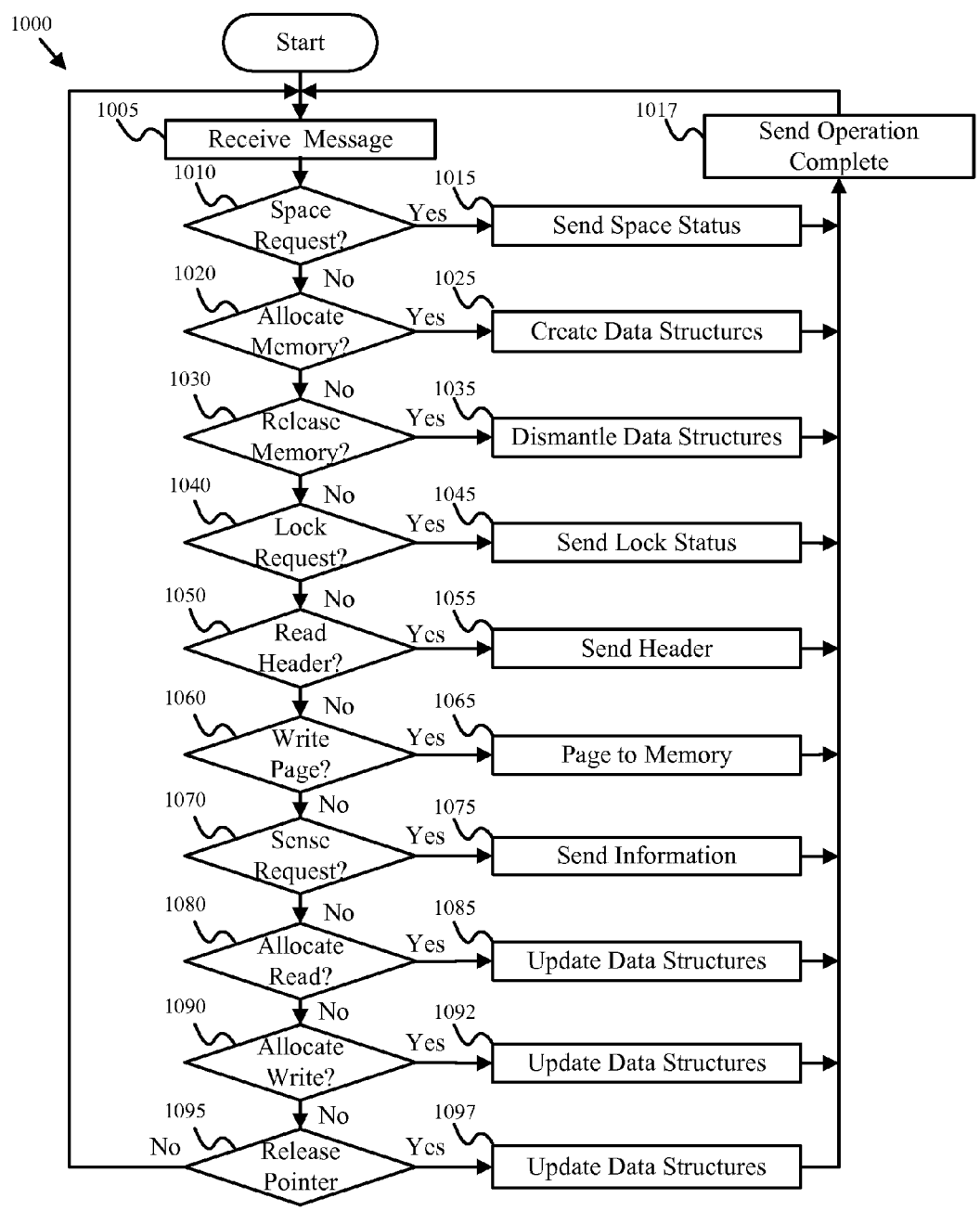
FIG. 10 is a flow chart illustrating one embodiment of a message response method of the present invention.

FIG. 10 is a flow chart diagram illustrating one embodiment of a message response method of the present invention. The depicted embodiment of the message response method 1000 includes a receive message step 1005, a space request test 1010, a send space status step 1015, a send operation complete step 1017, an allocate memory test 1020, a create data structures step 1025, a release memory test 1030, a dismantle data structures step 1035, a lock request test 1040, a send lock status step 1045, a read header test 1050, a send header step 1055, a write page test 1060, a page to memory step 1065, a sense request test 1070, a send information step 1075, an allocate read test 1080, an update data structures step 1085, an allocate write test 1090, an update data structures step 1092, a release pointer test 1095, and an update data structures step 1097

An originating node may receive a request from a process or an operating system such as a memory allocation request, a memory release request, an obtain read pointer request, an obtain write pointer request, or a release pointer request. The originating node sends synchronization messages to all other partner nodes. The message response method 1000 is executed by a partner node, and refers to actions and decisions taken in response to synchronization messages received from the origination node.

The partner node performs the receive message step 1005 by reading a message sent by the originating node. If the message is a space request 1010, then the send space status step 1015 is performed by sending the size of the free memory pool, after which the send operation complete step 1017 is performed. If the message is an allocate memory 1020, then the create data structures step 1025 is performed by creating data structures relating to allocation of the block of memory specified in the message. If the message is a release memory 1030, then the dismantle data structures step 1035 is performed by destroying the data structures created when the block of memory specified in the message was allocated.

If the message is a lock request 1040, then the send lock status step 1045 is performed by sending the lock status and owner of the page or similar memory block identified by a globally unique identifier. If the message is a read header 1050, then the send header step 1055 is performed by sending the data structures embedded in the header field of the allocation unit. If the message is a write page 1060, then the page to memory step 1065 is performed by copying the page or similar memory block from the originating node or virtual memory to the partner node local memory.

If the message is a sense request 1070, then the send information step 1075 is performed by sending information requested by the sense request message. If the message is an allocate read 1080, then the update data structures step 1085 is performed by updating the data structures relating to the page or similar memory block, including setting the read lock status and updating the owner information. If the message is an allocate write 1090, then the update data structures step 1092 is performed by updating the data structures relating to the page or similar memory block, including setting the write lock status and updating the owner information. If the message is a release pointer 1095, then the update data structures step 1097 may be performed by updating the owner information and releasing a read lock or write lock.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for fault tolerant virtual memory management, the apparatus comprising:
   a processing node configured to access at least one storage device and respond to paging synchronization messages, the processing node comprising:
   a local memory, and
   a memory manager configured to manage a plurality of memory blocks contained within the at least one storage device and the local memory as directed by the paging synchronization messages exchanged with a memory manager of a redundant processing node, wherein the memory manager and the redundant processing node memory manager each initiate the paging synchronization messages and wherein the memory manager and the redundant processing node memory manager continually synchronize the contents of the local memory and a local memory of the redundant processing node as each local memory is modified such that the processing node local memory and the redundant processing node local memory contain equivalent memory blocks.

2. The apparatus of claim 1, wherein the paging synchronization messages comprise a space request message, an allocate memory message, a release memory message, a lock request message, a read header message, a write page message, a sense request message, an allocate read message, an allocate write message, and a release pointer message.

3. The apparatus of claim 1, further comprising a communication module configured to send and receive the paging synchronization messages.

4. The apparatus of claim 1, wherein the at least one storage device comprises a plurality of redundantly arranged storage devices.

5. The apparatus of claim 1, further comprising a storage cache memory.

6. The apparatus of claim 1, wherein the memory manager is further configured to allocate memory blocks and associate a globally unique identifier therewith.

7. The apparatus of claim 1, wherein the memory manager further comprises a policy assignment module configured to associate a typical data structure size policy with a memory block allocation size.

8. The apparatus of claim 7, wherein the policy is user defined.

9. The apparatus of claim 1, wherein the processing node is a storage controller.

10. The apparatus of claim 9, wherein the memory manager is configured to conduct staging and destaging operations.

11. The apparatus of claim 1, wherein the memory manager further comprises a copy module configured to selectively use a plurality of copy methods.

12. The apparatus of claim 11, wherein the plurality of copy methods are selected from the group consisting of a SCSI command copy method, a DMA copy method, and a messaging copy method.

13. The apparatus of claim 1, wherein the memory manager is further configured to provide a memory pointer in response to a memory pointer request.

14. The apparatus of claim 13, wherein the memory pointers comprise read only pointers and write pointers.

15. A computer readable storage medium comprising computer readable program code for fault tolerant virtual memory management, the program code configured to conduct a method comprising:
  exchanging paging synchronization messages between a processing node and a redundant processing node, wherein the processing node and the redundant processing node each initiate the paging synchronization messages;
  managing a plurality of memory blocks contained within a storage device, a local memory of the processing node, and a local memory of the redundant processing node in response to the paging synchronization messages to continually synchronize the plurality of memory blocks contained in the processing node local memory and the redundant processing node local memory as each local memory is modified such that the processing node local memory and the redundant processing node local memory contain equivalent memory blocks.

16. The computer readable storage medium of claim 15, wherein the paging synchronization messages comprise a space request message, an allocate memory message, a release memory message, a lock request message, a read header message, a write page message, a sense request message, an allocate read message, an allocate write message, and a release pointer message.

17. The computer readable storage medium of claim 15, wherein the method further comprises allocating memory blocks and associating a globally unique identifier therewith.

18. The computer readable storage medium of claim 15, wherein the method further comprises associating a policy with a memory structure allocation size.

19. The computer readable storage medium of claim 18, wherein the method further comprises defining the policy based on user preferences.

20. The computer readable storage medium of claim 15, wherein managing paging comprises staging and destaging operations.

21. The computer readable storage medium of claim 15, wherein managing paging further comprises copying data using a plurality of copy methods selected from the group consisting of a SCSI command copy method, a DMA copy method, and a messaging copy method.

22. An apparatus for fault tolerant virtual memory management, the apparatus comprising:
  means for exchanging paging synchronization messages between a processing node and a redundant processing node, wherein each node initiates the paging synchronization messages;
  means for managing a plurality of memory blocks contained on a storage device, a local memory of the processing node, and a local memory of the redundant processing node in response to the paging synchronization messages to continually synchronize the plurality of memory blocks contained in the processing node local memory and the redundant processing node local memory as each local memory is modified such that the processing node local memory and the redundant processing node local memory contain equivalent memory blocks.

23. A system for fault tolerant virtual memory management, the system comprising:
  a first storage device;
  a first processing node configured to access the first storage device and exchange paging synchronization messages;
  a second storage device; and
  a second processing node configured to access the second storage device and exchange the paging synchronization messages with the first processing node, wherein the first and second processing nodes continually synchronize the contents of a local memory of the first processing node and a local memory of the second processing node as each local memory is modified such that each local memory contains equivalent memory blocks.

24. The system of claim 23, wherein the paging synchronization messages comprise a space request message, an allocate memory message, a release memory message, a lock request message, a read header message, a write page message, a sense request message, an allocate read message, an allocate write message, and a release pointer message.

25. The system of claim 23, further comprising a communication module configured to send and receive the paging synchronization messages.

26. The system of claim 23, wherein the at least one storage device comprises a plurality of redundantly arranged storage devices.

27. A method for fault tolerant virtual memory management, the method comprising:
  exchanging paging synchronization messages between a processing node and a redundant processing node;
  managing paging on a storage device, a local memory of the processing node, and a local memory of the redundant processing node in response to the paging synchronization messages to continually synchronize the processing node local memory and the redundant processing node local memory as each local memory is modified such that the processing node local memory and the redundant processing node local memory contain equivalent memory blocks.

28. The method of claim 27, wherein the paging synchronization messages comprise space request message, an allocate memory message, a release memory message, a lock request message, a read header message, a write page message, a sense request message, an allocate read message, an allocate write message, and a release pointer message.

29. The method of claim 27, wherein the program code is further configured to send paging synchronization messages to a redundant processing node.

* * * * *